(12) United States Patent
Ruiz Ortega et al.

(10) Patent No.: US 12,488,690 B2
(45) Date of Patent: Dec. 2, 2025

(54) BLIND SPOT INDICATOR ASSEMBLY FOR A MOTOR VEHICLE AND REAR-VIEW MIRROR COMPRISING SAID BLIND SPOT INDICATOR ASSEMBLY

(71) Applicant: FicoMirrors, S.A.U., Barcelona (ES)

(72) Inventors: Néstor Ruiz Ortega, Viladecavalls (ES); María Luisa Novella Requena, Viladecavalls (ES)

(73) Assignee: FICOMIRRORS, S.A.U., Barcelona (ES)

( * ) Notice: Subject to any disclaimer, the term of this patent is extended or adjusted under 35 U.S.C. 154(b) by 77 days.

(21) Appl. No.: 18/545,475

(22) Filed: Dec. 19, 2023

(65) Prior Publication Data

US 2024/0212504 A1   Jun. 27, 2024

(30) Foreign Application Priority Data

Dec. 22, 2022   (EP) ..................................... 22383266

(51) Int. Cl.
*G08G 1/16* (2006.01)
*B60Q 1/26* (2006.01)
(Continued)

(52) U.S. Cl.
CPC ........... *G08G 1/167* (2013.01); *B60Q 1/2665* (2013.01); *B60R 1/06* (2013.01); *B60R 1/1207* (2013.01);
(Continued)

(58) Field of Classification Search
CPC ......... B60R 1/06; B60R 1/088; B60R 1/1207; B60R 2001/1215; B60Q 1/2665;
(Continued)

(56) References Cited

U.S. PATENT DOCUMENTS 5,788,357 A * 8/1998 Muth ........................ F21V 9/00
    362/494
9,663,027 B2   5/2017 Hellin Navarro et al.
10,808,908 B2  10/2020 Fritz et al.
2005/0265037 A1* 12/2005 Newton ................ B60R 1/1207
    362/494

(Continued)

FOREIGN PATENT DOCUMENTS

CN   109278650 A      1/2019
DE   102016101997 A1  8/2017
(Continued)

OTHER PUBLICATIONS

European Application No. 22383266.8 filed Dec. 22, 2022; Extended European Search Report dated May 12, 2023; 11 pages.

*Primary Examiner* — Colin J Cattanach
(74) *Attorney, Agent, or Firm* — CANTOR COLBURN LLP

(57) ABSTRACT

The blind spot indicator assembly (100) comprises a housing (110) having a first area (120) in an inner surface thereof with a light-reflective portion, a light source (200) to project light along a first direction (D1) to the light-reflective portion, a lens assembly (300) with a light-receiving portion (350) to receive light reflected from the light-reflective portion from the light source, and a second area (131) with a light-absorbing portion (130) for absorbing directly or indirectly light from the light source (200). A rear-view mirror is also disclosed comprising said blind spot indicator assembly (100).

14 Claims, 1 Drawing Sheet

(51) Int. Cl.
  *B60R 1/06* (2006.01)
  *B60R 1/08* (2006.01)
  *B60R 1/12* (2006.01)
  *B60S 1/02* (2006.01)
  *F21V 7/00* (2006.01)

(52) U.S. Cl.
  CPC ....... *B60R 1/088* (2013.01); *B60R 2001/1215* (2013.01); *B60S 1/026* (2013.01); *F21V 7/0008* (2013.01)

(58) Field of Classification Search
  CPC .......... B60Q 1/32; B60Q 1/323; B60Q 1/324; B60Q 1/325; B60Q 1/326; B60Q 1/46; B60Q 1/1207; F21V 7/0008
  See application file for complete search history.

(56) References Cited

U.S. PATENT DOCUMENTS

| | | | |
|---|---|---|---|
| 2008/0225417 A1* | 9/2008 | Kuhn | B60Q 1/2665 359/839 |
| 2012/0206930 A1* | 8/2012 | Minikey, Jr. | B60R 1/12 362/494 |
| 2014/0185310 A1 | 7/2014 | Lisowski et al. | |
| 2015/0232020 A1* | 8/2015 | Hellin Navarro | F21S 43/30 362/516 |
| 2016/0046239 A1 | 2/2016 | Mathieu et al. | |
| 2016/0078768 A1 | 3/2016 | Huizen et al. | |
| 2017/0219181 A1 | 8/2017 | Lisowski et al. | |
| 2017/0227187 A1* | 8/2017 | Fritz | F21S 43/31 |
| 2018/0335188 A1* | 11/2018 | Di Trapani | F21V 7/0008 |
| 2020/0298763 A1* | 9/2020 | Huang | B60R 1/1207 |

FOREIGN PATENT DOCUMENTS

| | | |
|---|---|---|
| EP | 3904159 A1 | 11/2021 |
| JP | 2013161656 A | 8/2013 |

* cited by examiner

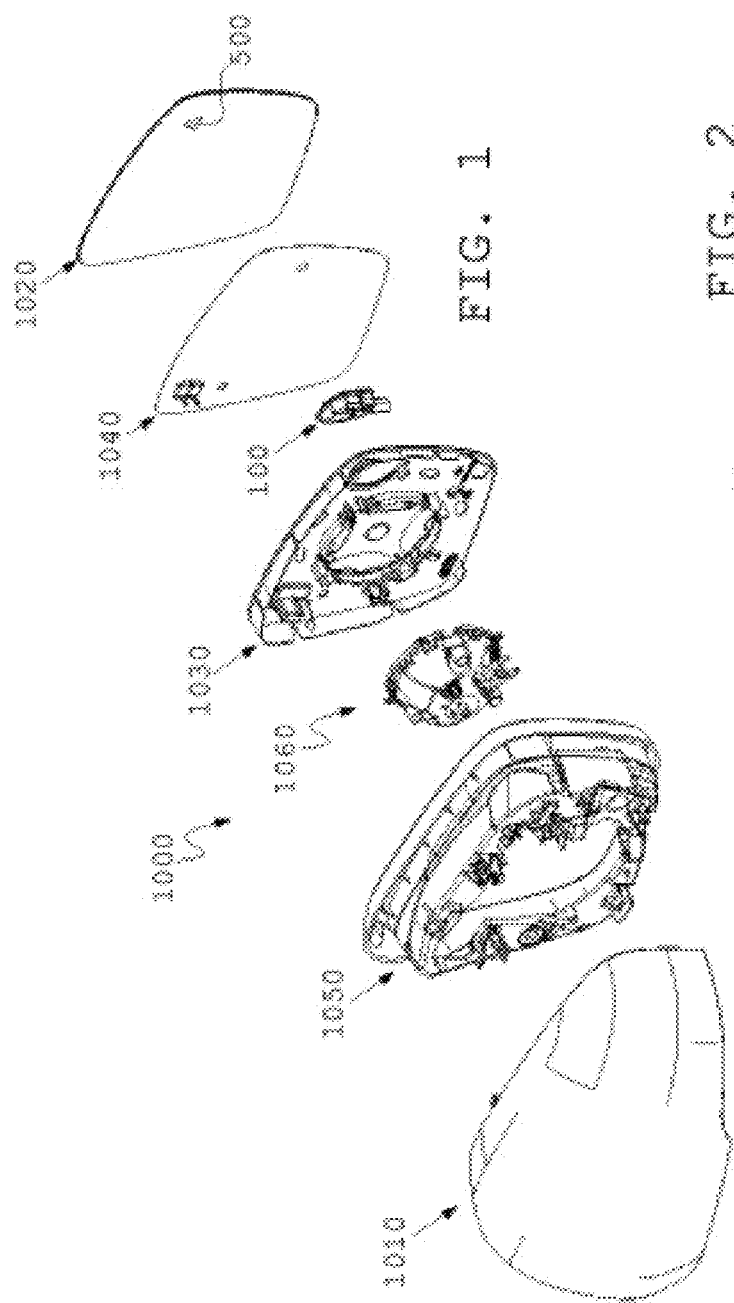
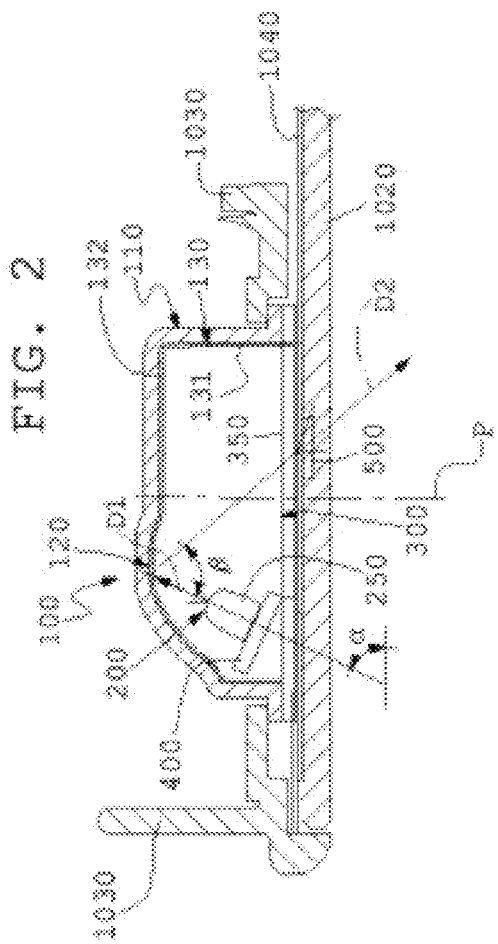

BLIND SPOT INDICATOR ASSEMBLY FOR A MOTOR VEHICLE AND REAR-VIEW MIRROR COMPRISING SAID BLIND SPOT INDICATOR ASSEMBLY

CROSS-REFERENCE TO RELATED APPLICATIONS

This application claims the benefit of European Application Serial No. 22383266.8 filed Dec. 22, 2022, the disclosure of which is incorporated herein by reference in its entirety.

BACKGROUND

The present disclosure relates to indicator assemblies intended to warn a motor vehicle driver that an object, such as another vehicle, is within a blind spot or blind area.

A blind spot or area is a lateral zone near the motor vehicle where the driver has no suitable vision when looking in the rear-view mirrors.

Blind spot indicators are known based on sensors and optical elements that identify when objects enter a blind spot or zone that are capable of alerting the driver that the blind spot is now being occupied by an object, such as for example a vehicle in the adjacent lane.

One example of a rear-view mirror assembly having a blind spot indicator for motor vehicles is disclosed in U.S. Pat. No. 9,663,027 filed in the name of the same applicant of the present application. The rear-view mirror assembly comprises a reflective element attached to a clamping plate, and a watertight illumination module attached to the clamping plate. A printed circuit board is arranged in an inner cavity of the watertight illumination at an angle to the clamping plate. At least one light emitting diode is provided on the printed circuit board. A protective case for the watertight illumination module has a metalized and textured surface in its interior. A first side of the printed circuit board rests on the watertight illumination module and a second side opposite the first side does not rest on the watertight illumination module, with the printed circuit board. The light emitted by the light emitting diodes bounces on the metalized surface of the protective case emitting light indirectly towards the surface of the reflecting element through its opening.

Although blind spot indicators enhance driving safety, it has been found that a problem exists that illumination is partially directed on users different from the driver as the user is driving. Thus, there still remains a need for blind spot indicators in which the illumination on users different from the driver can be efficiently avoided with reduced costs and in which enhanced light focusing is provided such that most of the light emitted by the blind spot indicator is directed to the driver.

SUMMARY

The present disclosure provides a blind spot indicator assembly for a motor vehicle for warning of the presence of another vehicle or object in the vicinity which has been found to address the above issues in prior art devices while, at the same time, provides further significant advantages.

The present blind spot indicator assembly may be, for example, a visual indicator to show the driver that another vehicle or object has been detected.

The present disclosure further relates to a rear-view mirror assembly for motor vehicles including such blind spot indicator assembly.

The blind spot indicator assembly for motor vehicles disclosed herein comprises a housing with an inner surface having a first area and a second area.

The first area of the housing formed in an inner surface thereof includes a light-reflective portion. Said light-reflective portion may further include a light diffuser-portion. In any case, when a light beam bounces off said portion of the inner surface of the housing its direction is changed. The light-reflective portion may be, for example, a light-reflective element attached to the inner surface of the housing. Alternatively, the light-reflective portion may be a suitable coating formed in the inner surface of the housing. In some cases, the light-reflective portion may be light diffuser and be formed such as by graining. The light-reflective portion could be also formed by the colour of the housing interior itself, such as a white color.

The blind spot indicator assembly also includes at least one light source. The light source, that may include one or more light emitting diodes, is arranged within the housing of the blind spot indicator assembly. The light source is arranged to project light along a first predetermined direction towards the above mentioned light-reflective portion of the housing. The light source may include an optics which in turn may be a collimator.

A lens assembly is also provided. The lens assembly is adapted to allow light to come out from the blind spot indicator assembly. For this purpose, the lens assembly may comprise at least one lens layer such as for example a transparent lens layer or diffusor. The lens assembly has a light-receiving portion that is arranged to receive light reflected from the above-mentioned light-reflective portion of the housing from the at least one light source. The lens assembly may comprise at least one light diffuser lens. The light source is arranged between the lens assembly and the light-reflective portion of the housing.

The second area of the inner surface of the housing includes a light-absorbing portion which may be for example a light absorbing color or material, or an internal portion of the housing having a light reflection lower than that of the reflecting portion, e.g. having a reflection index of 50%, 40% or even 30% lower than the reflecting portion. The light-absorbing portion is configured for absorbing light from the light source, that is, light may come directly from the light source or from the light-reflective portion. It may be preferred that the light-absorbing portion is adjacent the light-receiving portion of the lens assembly. The light-absorbing portion may be arranged in contact with the light-receiving portion of the lens assembly. If required, there could be a gap between the light-absorbing portion and the light-receiving portion. The dimension of the gap may be for example less than 15 mm, such as less than 10 mm, preferably, less than 8 mm, and optimally less than 5 mm. In any case, the purpose of the light absorbing portion is eliminating or at least reducing the light coming out of the device that is not directed to the driver.

The light-absorbing portion may be a light-absorbing element attached or added by any means to an inner surface of the housing that performs a light-absorbing function, a suitable coating formed therein, or the second area of the housing inner surface itself may be made of a light-absorbing material. This can be achieved by providing a housing made from a light absorbing material and adding a light reflective material therein.

It may be preferred that the second area of the housing further extends into at least an additional area of the inner surface of the housing that is positioned in close proximity to the light-reflective portion.

The above-mentioned light-absorbing portion formed in the second area of the inner surface of the housing may comprise a light-absorbing portion. The light-absorbing portion may be defined by a black portion or a suitable low-reflective area with a reflection coefficient below 50%, preferably below 40%, and optimally below 30% with respect to the light-reflective portion. For example, two color bi-injection of the same or different material may be provided to the inner surface of the housing to act as light-absorbing element. The material of the inner surface of the housing may itself act either as a light-reflective portion or as a light-absorbing portion.

The light source may be arranged within the housing such that said first predetermined direction is at an angle with respect to a plane of the lens assembly, such as, for example, at an angle ranging from 30 to 100°. Other values may be possible.

One or more electronics carrier, such as a printed circuit board (PCB) may be provided. In use, the light source is connected to said electronics carrier. Preferably, the light source is arranged on the PCB.

The housing of the blind spot indicator assembly may be conceptually divided into a first half and a second half by a plane substantially perpendicular to the lens assembly. In use, the light source is arranged in said second half of the housing of the blind spot indicator assembly, while at least 60-70% of the light-absorbing portion that is arranged or formed in the second area of the inner surface of the housing is in said first half of the housing of the blind spot indicator assembly. Further, the light absorbing portion is adjacent to the light-receiving portion of the lens assembly.

The present disclosure further relates a rear-view mirror for a motor vehicle that includes the blind spot indicator assembly described above. The present rear-view mirror further comprises a mirror head that includes a glass pane and a mirror plate for attachment of the glass pane to the mirror head. An icon element is formed in the glass pane. The icon element may be for example a triangle although many other symbols may be used. The icon element acts as a warning indicator such that when a vehicle is detected within the blind spot area, the icon element is illuminated in the rearview mirror. For this purpose, the icon element is optically connected to the light-receiving portion of the lens assembly to be illuminated by light received from the light-reflective portion formed in the housing of the blind spot indicator assembly. When the rear-view mirror is already installed in the vehicle, the main light output direction from the blind spot indicator is directed towards the driver.

In one example of the present rear-view mirror, a heater is attached to at least one of the glass pane, the mirror plate, the housing and the lens assembly of the blind spot indicator assembly described above. The purpose of the heater is to provide resistive heat to the glass pane. Said heater may comprise a sheet material with electrical resistance for delivering thermal energy as an electric current flows there through. This results in that a defrosting effect is provided, as well as removal of obstacles and any water-based obstructions that may be attached to the glass pane. The heater includes a through opening for allowing light to pass through so as to allow optical connection between the blind spot indicator assembly and the icon element in the glass pane.

If, as stated above, the blind spot indicator assembly is conceptually divided into a first half and a second half by a plane substantially perpendicular to the lens assembly, in use, said first half is located closer the vehicle and said second half is located away from the vehicle. In this case, the light source is arranged in said second half of the housing of the blind spot indicator assembly, while at least 60-70% of the light-absorbing portion that is arranged or formed in the second area of the inner surface of the housing is in said first half of the housing. Further, the light absorbing portion is adjacent to the light-receiving portion of the lens assembly.

With the present blind spot indicator assembly for a motor vehicle and rear-view mirror assembly having said blind spot assembly, it has been found that illumination on users different from the driver can be avoided in an efficient manner and at a reduced cost.

BRIEF DESCRIPTION OF THE DRAWINGS

A non-limiting example of the present disclosure will be described in the following, with reference to the appended drawings.

FIG. 1 is a disassembled view of a rear-view mirror for a motor vehicle including a blind spot indication assembly, in accordance with a non-limiting example; and FIG. 2 is a cross-sectional view of the blind spot indication assembly of FIG. 1, in accordance with a non-limiting example.

DETAILED DESCRIPTION

In the exploded perspective view of FIG. 1 of the drawings, one non-limiting example of a rear-view mirror for a motor vehicle is illustrated having the present blind spot indicator assembly 100.

The rear-view mirror comprises a mirror head 1000 shown in FIG. 1 that includes in turn a mirror housing 1010, a mirror frame 1050, and a glass pane 1020 having therein an icon element 500. The icon element 500 may be a shaped translucent area formed in the glass pane 1020 of the rear-view mirror adapted for allowing at least one portion of light to pass there through. The icon element 500 may be formed either by removing a portion of the reflective material in the glass pane 1020 or it may be an element having a defined geometry, such as circle, square, etc., arranged between the light source 200 and a suitable area located in the glass pane 1O2O. The glass pane 1020 is attached to the mirror head 1000 through a mirror plate 1030. The glass pane 1020 may be moved to the mirror head 1000 through a glass actuator 1060.

A heater 1040 is attached to the glass pane 1020 and/or the mirror plate 1030. The heater 1040 is intended for resistive heating of the glass pane 1020. For this purpose, the heater 1040 comprises a sheet material with electrical resistance for delivering thermal energy as an electric current flows there through. This results in that a defrosting effect is provided, as well as removal of obstacles and any water-based obstructions that may be attached to the above-mentioned glass pane 1020. The heater 1040 includes a through opening, not shown, for allowing light to pass through.

The mirror head 1000 shown in FIG. 1 further comprises the above-mentioned blind spot indicator assembly 100 which is shown in detail in the sectional view of FIG. 2 of the drawings. The blind spot indicator assembly 100 is configured for warning of the presence of another vehicle or object in the vicinity.

The blind spot indicator assembly 100 comprises a housing 110 having an inner surface. The inner surface of the housing 110 comprises a first area 120 positioned at a left-half of FIG. 2 that includes a light-reflective portion. In the preferred example described herein, the light-reflective portion of said first area 120 further includes a light diffuser-portion or light-diffuser layer.

When a light beam bounces off the light-reflective portion of the first area 120 of the inner surface of the housing 110, a first predetermined direction D1 of said light beam is changed into a second predetermined direction D2 extending at angle β to the first predetermined direction D1 as shown in FIG. 2. The light-reflective portion of the first area 120 may be, for example, a light-reflective element attached to the inner surface of the housing 110 or a suitable coating as required. The light-reflective portion may be in some cases a light diffuser-portion and may be formed by graining.

The blind spot indicator assembly 100 further includes a light source 200 arranged at one lateral side of the housing 110. The light source 200 comprises one or more light emitting diodes 250 arranged within the housing 110, connected to an electronics carrier, such as printed circuit board, PCB, 400. The light source 200 is arranged to project light along said first predetermined direction D1 towards the light-reflective portion of the first area 120 of the inner surface of the housing 110. The light source 200 may include an optics which in turn may be a collimator.

The blind spot indicator assembly 100 further includes a lens assembly 300 as mentioned above. The lens assembly 300 comprises at least one light lens having a light-receiving portion 350 arranged to receive light from the light source 200 which is reflected from the above-mentioned light-reflective portion in the first area 120 of the inner surface of the housing 110. The at least one light lens may be a diffuser layer. As shown in FIG. 2, the light source 200 is arranged between the lens assembly 300 and the light-reflective portion of the first area 120 of the inner surface of the housing 110. More in particular, and still referring to FIG. 2, the light source 200 is arranged such that the first predetermined direction D1 is at an angle α of 30-100° to the lens assembly 300.

The inner surface of the housing 110 of the blind spot indicator assembly 100 further comprises a second area 131 positioned at a right-half of FIG. 2, opposite a location where the light source 200 is arranged. The second area 131 includes a light-absorbing portion 130 that may be a light-absorbing element attached to the inner surface of the housing 110, a suitable coating, or any suitable light-absorbing arrangement capable of absorbing directly or indirectly light from the light source 200. In the example shown in FIG. 2, one end of the second area 131 with light-absorbing portion 130 is adjacent to one corresponding end of the first area 120 having the light-reflective portion, more in particular, in contact therewith.

The housing 110 of the blind spot indicator assembly 100 may be conceptually divided into a first half and a second half by a plane P that is substantially perpendicular to the lens assembly 300, according to FIG. 2. In use, the light source 200 is arranged in said second half of the housing 110 of the blind spot indicator assembly 100, while at least 60-70% of the light-absorbing portion 130 that is arranged or formed in the second area 131 of the inner surface of the housing 110 is in the first half of the housing 110. Further, the light absorbing portion 130 is adjacent to the light-receiving portion 350 of the lens assembly 300.

It is to be noted that the direction of the light exiting the blind spot indicator assembly 100 corresponds to the above mentioned second predetermined direction D2, different from the first predetermined direction D1 of the light emitted from the light source 200.

Referring again to FIG. 2, the second area 131 of the inner surface of the housing 110 further extends into an additional area 132 such that one end of said additional area 132 is in close proximity to one corresponding end of the first area 120.

The light-absorbing portion 130 in the second area 131 of the inner surface of the housing 110 may have a black portion or a low-reflective area with a reflection coefficient below 30-50% with respect to the light-reflective portion. For example, two color bi-injection of the same or different material may be provided to the inner surface of the housing 110. A coating may be applied to the inner surface of the housing 110 or it may be an element added thereto performing a light-absorbing function. Thus, the material of the inner surface of the housing 110 may itself act either as a light-reflective portion or as a light-absorbing portion. The second area 131 is adjacent the light-receiving portion 350 of the lens assembly 300, thereby restricting the direction of light leaving the blind spot indicator assembly 100.

The blind spot indicator assembly 100 shown in FIG. 2 is fitted in mirror head 1000 shown in FIG. 1 such that, in use, the second predetermined direction D2, that is, the main light output direction, is directed towards the driver.

Reference is made here again to the above-mentioned conceptual division of the housing 110 of the blind spot indicator assembly 100 into a first half and a second half by a plane P that lies substantially perpendicular to the lens assembly 300 according to FIG. 2. In use, the first half of the housing 110 is closer the vehicle while the second half of the housing 110 is away from the vehicle. In this case, the light source 200 is arranged in said second half of the housing 110 of the blind spot indicator assembly 100, while at least 60-70% of the light-absorbing portion 130 that is arranged or formed in the second area 131 of the inner surface of the housing 110 is in the first half of the housing 110. Further, the light absorbing portion 130 is adjacent to the light-receiving portion 350 of the lens assembly 300.

The icon element 500 of the glass pane 1020 in the mirror head 1000 shown in FIG. 1 may be any suitable symbol such as a triangle or the like to warn the driver that vehicle is within the blind spot area. In this case, the icon element 500 is illuminated in the mirror head 1000. For this purpose, the icon element 500 is located in a position in an optical connection to the light-receiving portion 350 of the lens assembly 300 to be illuminated by light received from the light-reflective portion in the inner surface of the housing 110 of the blind spot indicator assembly 100.

The heater 1040 of the mirror head 1000 described above may be also attached to the housing 110 or to the lens assembly 300 of the blind spot indicator assembly 100 if required.

Although only one example has been disclosed herein, other alternatives, modifications, uses and/or equivalents thereof are possible. Furthermore, all possible combinations of the described examples are also covered. Thus, the scope of the present disclosure should not be limited by particular examples but should be determined only by a fair reading of the claims that follow. If reference signs related to drawings are placed in parentheses in a claim, they are solely for attempting to increase the intelligibility of the claim and shall not be construed as limiting the scope of the claim.

What is claimed is:

1. A blind spot indicator assembly for a motor vehicle, the assembly comprising:

a housing having a first area formed in an inner surface thereof including a light-reflective portion;
at least one light source arranged within the housing to project light along a first predetermined direction towards the light-reflective portion of the housing;
a lens assembly having a light-receiving portion arranged to receive light reflected from the light-reflective portion of the housing from the at least one light source;
wherein at least a second area of the inner surface of the housing, different than the first area, includes a light-absorbing portion for absorbing directly or indirectly light from the light source;
wherein the light-absorbing portion is adjacent to the light-receiving portion of the lens assembly:
wherein the housing is divided into a first half and a second half by a plane perpendicular to the lens assembly; and
wherein the light source is positioned in the second half of the housing, while at least 60% to 70% of the light absorbing portion that is disposed in the second area of the inner surface of the housing is positioned in the first half of the housing.

2. The assembly according to claim 1, wherein the second area further extends into at least an additional area of the inner surface of the housing that is in close proximity to the light-reflective portion.

3. The assembly according to claim 1, wherein the light-reflective portion further includes a light diffuser-portion.

4. The assembly according to claim 1, wherein the light source is arranged within the housing such that said first predetermined direction is at an angle with respect to a plane of the lens assembly perpendicular to the plane (P).

5. The assembly according to claim 4, wherein the angle of inclination ($\alpha$) of the first predetermined direction (D1) with respect to the plane of the lens assembly ranges from 30-100°.

6. The assembly according to claim 1, further comprising at least one electronics carrier to which the light source is connected.

7. The assembly according to claim 1, wherein the light source includes at least one light emitting diode.

8. The assembly according to claim 1, wherein the lens assembly comprises at least one light diffuser lens.

9. The assembly according to claim 1, wherein the light-reflective portion is a light-reflective element attached to an inner surface of the housing.

10. The assembly according to claim 1, wherein the light-absorbing portion is a light-absorbing element attached to an inner surface of the housing.

11. A rear-view mirror for a motor vehicle comprising:
a blind spot indicator assembly according to any preceding claim; and
a mirror head that includes a mirror housing, a glass pane, a mirror plate for attachment of the glass pane to the mirror head, and an icon element in the glass pane in a position corresponding to the light-receiving portion of the lens assembly to be illuminated by light received from the light-reflective portion formed in the housing of the blind spot indicator assembly.

12. The rear-view mirror according to claim 11, further comprising a heater attached to at least one of the glass pane, the mirror plate, and the housing of the blind spot indicator assembly.

13. The assembly according to claim 1, wherein the light-reflective portion is one of a coating formed on an inner surface of the housing, a light diffuser formed by graining on the inner surface of the housing, or a formed color of the inner surface of the housing.

14. The assembly according to claim 1, wherein the light-absorbing portion is one of a light absorbing color or material of an inner surface of the housing or an internal portion of the housing having a light reflection lower than that of the reflecting portion.

* * * * *